Aug. 20, 1929.　　　R. E. PEOPLES　　　1,724,962
ELECTRICAL TESTING SYSTEM
Filed Oct. 18, 1927
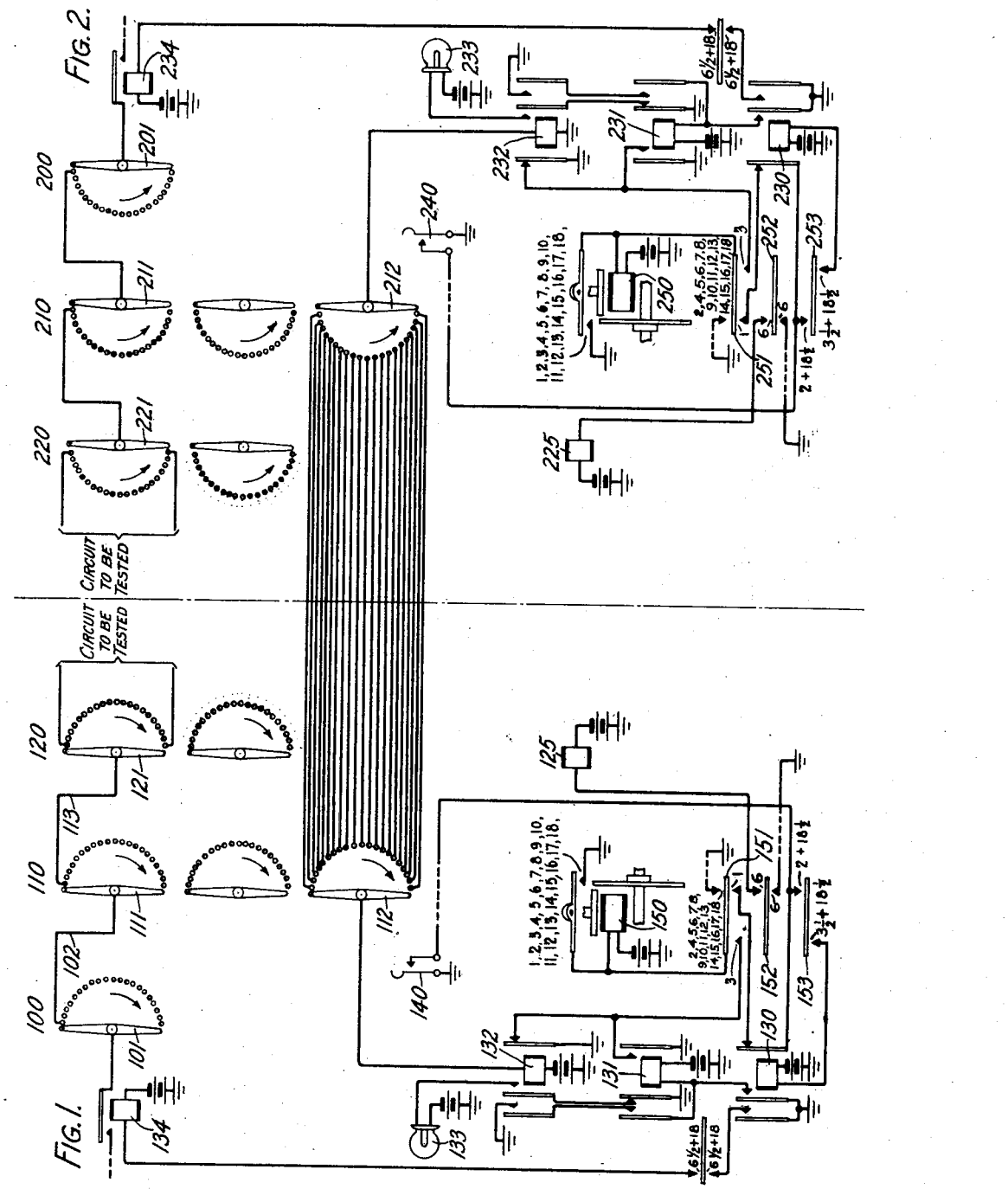
INVENTOR:
ROBERT E. PEOPLES
By
　　　　ATTORNEY Patented Aug. 20, 1929.

1,724,962

UNITED STATES PATENT OFFICE.

ROBERT E. PEOPLES, OF VALLEY STREAM, NEW YORK, ASSIGNOR TO BELL TELEPHONE LABORATORIES, INCORPORATED, OF NEW YORK, N. Y., A CORPORATION OF NEW YORK.

ELECTRICAL TESTING SYSTEM.

Application filed October 18, 1927. Serial No. 226,868.

The present invention relates to a testing system in automatic telephone offices. More specifically, it relates to means for governing the operation of a plurality of routine testing devices arranged for progressively testing like circuits of a telephone office.

In some automatic telephone offices, a very large number of each type of switching circuit is used. To properly maintain a large number of switching circuits, more than one testing device for each type of circuit is often necessary. Automatically progressive routine testing devices may be economically used for this purpose. Ordinarily, when a plurality of such testing devices are used in this manner, the circuits to be tested are divided into groups, each testing device being associated only with the circuits of one group. This system of testing has, however, been found to be limited from an economic viewpoint. There is considerable advantage in having each of a plurality of testing devices progressively test all like circuits of an office. Each testing device may be arranged to make the same tests of the circuits or each may be arranged to make different tests. With a plurality of routine testing devices progressing simultaneously over the like circuits of an office, interference between said devices might be expected if one testing device progresses more rapidly than another. For this reason, some means is necessary for controlling the testing devices when more than one of such devices attempts to test the same circuit or group of circuits.

In accordance with the present invention, this control means takes the form of a circuit arrangement, which is the same in each testing device, for governing the operation of a plurality of such testing devices, permitting each device to normally operate independently in their testing operation as long as they do not attempt to select and test the same circuit or group of circuits, in which case, the circuit arrangement in each testing device is operated. The testing device first to select a circuit or group of circuits is permitted to proceed with its testing function and the second device to select a circuit or group of circuits is held up until the first device has proceeded to a predetermined point. The control means in each testing device may be arranged for operation when two testing devices attempt to test any individual circuit. This means may also be arranged to control the testing devices when the circuits to be tested are divided into groups. The latter arrangement permits the testing device, that was first to select a group, to progressively test the circuits of the group without interference from a second testing device to select the same group. The second testing device may remain associated with the first circuit of the group until the first testing device has tested the last circuit in the group. The control means then permits the second testing device to operate for a progressive routine test of the circuits in the group.

When two testing devices attempt to test the same circuit or group of circuits, a signal is lighted. An attendant may disregard the signal or may advance the testing device, that is second to select a group, for testing the circuits of a different group.

Figs. 1 and 2 illustrate two like testing devices arranged for progressively testing the same type of selector switches in a telephone office. These testing devices are shown schematically and are the same as disclosed and described in Patent No. 1,650,721, issued November 29, 1927, to R. E. Peoples. Switches 100, 110 and 120 illustrate a pyramid formation of switches for extending conductors from the testing circuit to the individual circuits to be tested. Switches 200, 210 and 220 represent a similar pyramid formation of switches in a second testing device. Switches 100 and 200 are known as master switches and are the same as switch 1910 of the aforementioned application. Switches 110 and 210 are known as group switches for extending the conductors from the master switch to a plurality of individual connector switches such as 120 and 220. The group switches 110 and 210 are disclosed in the aforementioned application, Figs. 16 and 17. In the aforementioned disclosure four individual switches are used as a group switch. The four switches that represent a group switch are numbered 1610, 1630, 1710 and 1730. The connector switches 120 and 220 are the same as switch 1920 disclosed in the aforementioned application.

The sequence switches, step by step switches and relays shown in Figs. 1 and 2 may be of any well known type.

Let it be assumed that automatically progressive tests are to be made of all of the like switches in a telephone office. These switches may be of the same type as disclosed in my aforementioned copending application. All of the switches to be tested are connected to the contacts of switches such as 120, which are connected in multiple with the contacts of switches such as 220. A large plurality of the switches such as 120 and 220 are connected with the testing circuits through the contacts and brushes of switches 110 and 100 or 210 and 200. Each contact of switch 110 is associated with a different switch 120. Each contact of switch 100 is connected to a different switch 110. These switches are progressively positioned for the completion of tests of a group of circuits. Switch 120 is progressively positioned each time the test of a circuit is completed until all the circuits connected to the contacts of the switch have been tested. Upon the completion of the test of circuits associated with switch 120, the switch 110 is progressively positioned for association with a second switch 120. A plurality of switches, such as 110, are associated with the master switch 100. This master switch is progressively positioned upon the completion of a large plurality of circuits that are associated with each switch 110.

In practice the switch 100 is positioned differently than switch 200 when the two testing circuits, Figs. 1 and 2, are simultaneously started. To start the two testing devices into simultaneous operation keys 140 and 240 are actuated. The responsive operations are the same in each circuit Fig. 1 and Fig. 2 unless they encounter each other. The operation of key 140 associates ground through the right contact of relay 130, right lower contact of cam 151, magnet 150 to battery. An energizing circuit for the sequence switch 150 is thus established for rotating the sequence switch from position 1 to position 2. In my aforementioned application other apparatus is operated preceding the movement of the sequence switch. It is believed unnecessary to encumber this description with a description of the operation of this apparatus. Other operations of the testing circuit apparatus establish a circuit to again energize the sequence switch 150 for its rotation from position 2 to position 3. In position 3 a circuit is again established for energizing the magnet 150 from battery, through its winding, left lower contact of cam 151 to ground through the right normal contact of relay 132. The sequence switch is thus rotated into position 4. In position 4 a circuit is established to energize relay 130 from battery, through its winding, lower and upper contacts of sequence switch cam 153 to ground through the start key 140. The operation of relay 130 establishes obvious circuits for the energization of relays 131 and 134. The operation of relay 134 interconnects conductors extending from switch 100 to the testing circuit apparatus for controlling various tests of the selector switches. The operation of relay 131 has no function until such time as the two testing devices are associated with the same group of selector switches to be tested.

During the rotation of the sequence switch 150 circuits are established for positioning switch 100 for associating brush 101 with conductor 102 and switch 110 is positioned for associating brush 111 with conductor 113 as described in the aforementioned application. The apparatus of the testing circuit repositions the sequence switch for the control of these switches and in position 6 establishes control circuits for associating brush 121 with the first circuit to be tested. In this sequence switch position the stepping switch magnet 125 is energized from battery, through its winding, upper and lower contacts of cam 152, through testing circuit apparatus to ground. This magnet rotates brush 121 for association with a different selector switch upon the completion of the test of each selector switch.

The operation of the circuit of Fig. 2 for associating switches with the circuits to be tested is the same as described for Fig. 1, the difference in operation being only apparent when the two circuits attempt to test selector switches of the same group.

Since the testing circuits are started at different points with relation to the groups of the selectors to be tested, they will not regularly be associated with the same group. It is, however, often the case that trouble is encountered to delay the progressive movement of one testing circuit. The second testing circuit in the office may progress rapidly and attempt to make tests in a group already occupied by an alternate testing device.

The link circuits extending between the contacts associated with brushes 112 and 212 of switches 110 and 210 are provided for the operation of apparatus to prevent interference between testing devices arriving in the same group. It will be noted that the winding of relay 132 is connected to battery and the winding of relay 232 is connected to ground. If the brushes 112 and 212 are both associated with the contacts in position 10, a circuit is established to operate both relays 132 and 232 from ground through the winding of relay 232, brush 212 and its associated contact in position 10, link 10, brush 112 and its associated contact in position 10 to battery through the winding of relay 132.

If the testing circuit, Fig. 1 is first to establish itself in the group associated with link 10, relays 130 and 131 are operated during the test of each circuit in the group. The operation of relay 132 establishes a locking circuit for relay 131 from ground through the left outer contact of relay 132, left outer contact and winding of relay 131 to battery. This locking circuit remains established as long as the second testing circuit, Fig. 2, is associated with link 10. It will be noted that the operation of relay 132 removes the ground circuit formerly traced for rotating the sequence switch 150 out of position 3. This ground circuit is, however, maintained through the right contact of relay 131. Upon subsequent progressive movements of the testing circuit, Fig. 1, relays 130 and 134 are released when a change is made from one circuit to the next. This is done in order to open the conductors extending between the testing circuit and the circuit to be tested. Under this condition it is necessary to maintain relay 131 in a locked position in order to rotate the sequence switch out of position 3 since in this position of the sequence switch relay 130 is normal.

As previously stated, relay 232 and 132 were operated in series. The operation of relay 232 opens the energizing circuit ordinarily used for rotating the sequence switch 250 from position 3 to position 4. If a circuit cannot be established for rotating the sequence switch 250 out of position 3, relay 230 cannot be operated. Therefore, the circuit for rotating sequence switch 250 out of position 3 through the left contact of relay 231 cannot be established. The second testing device to select link 10 or any other link is thus prevented from making tests.

The relays of Figs. 1 and 2 are maintained as hereinbefore described until one of the testing circuits is disconnected from the link. A lamp is lighted to indicate the second one of two testing circuits to be associated with the same link. Assuming that Fig. 2 is the second testing circuit to be associated with a link, a circuit is established to light lamp 233 from battery through the filament of the lamp, right inner contact of relay 232, to ground through the right inner normal contact of relay 231.

An attendant may permit two testing circuits to remain connected together in order that the second testing circuit associated with the link may test the circuits of the group after the first testing circuit has finished. This would be done when alternate testing circuits are arranged to make a different type of test. An attendant may also elect to reposition the testing circuit in which the lamp signal has been lighted.

The testing circuit, Fig. 1, has been used in this description as the first to be associated with a link and the operation of the relays described accordingly. If the testing circuit, Fig. 2, is the first to be associated with the link and Fig. 1 is the second, the operation of the relays is reversed. A locking circuit will be established for relay 231 instead of 131 and the testing circuit, Fig. 2, is the one to be advanced for successive tests of the circuits of the group. The lamp 133 is lighted instead of lamp 233.

What is claimed is:

1. In a system for testing a plurality of circuits, a plurality of testing devices for progressively testing said circuits, means for operating said testing devices, and means in each testing device operable during the test of a circuit to prevent a test of said circuit by an alternate testing device.

2. In a system for testing a plurality of circuits, a plurality of testing devices, switching means in each testing device for progressively associating said devices with said circuits, interconnecting links between said switching means, means for connecting said testing devices to any of said links, and means operable in response to the successive association of alternate testing devices with the same link for permitting the operation of only one testing device.

3. In a system for testing a plurality of circuits, a plurality of testing devices, switching means in each testing device for progressively associating said devices with said circuits, interconnecting links between said switching means, means for connecting said testing devices to any of said links, and means operable in response to the association of a testing device with each of said circuits for preventing the operation of an alternate testing device subsequently connected to the same link.

4. In a system for testing a plurality of circuits divided into groups, a plurality of testing devices, means for operating said testing devices for successively testing the circuits of all groups, and means in each testing device operable during the test of the circuits in a group to prevent tests of the circuits in said group by an alternate testing device.

5. In a system for testing a plurality of circuits divided into groups, a plurality of testing devices, switching means in each testing device for progressively associating said devices with the circuits of all groups, interconnecting links between said switching means, one link for each group, and means operable in response to the successive association of alternate testing devices with the same link for permitting the operation of only one testing device associated with said link.

6. In a system for testing a plurality of circuits divided into groups, a plurality of testing devices, means for operating said testing devices for successively selecting said groups of circuits, means in a testing device operable in response to the association of said testing device with the circuits of a group for preventing the operation of a second testing device subsequently selecting the same group of circuits, and means operable in the testing device first associated with the group for causing the successive association of said device with the circuits of said group for testing said circuits.

7. In a system for testing a plurality of circuits, a plurality of testing devices for progressively testing said circuits, means for operating said testing devices and like means in each testing device operable by the association of two of said devices with the same circuit for permitting only one of said devices to make tests of said circuit.

8. In a system for testing a plurality of circuits, a plurality of testing devices for progressively testing said circuits, means for operating said testing devices and like means in each testing device operable by the association of two of said devices with the same circuit for permitting the first device associated with said circuit to make tests of said circuit.

9. In a system for testing a plurality of circuits, a plurality of testing devices for progressively testing said circuits, means for operating said testing devices and like means in each testing device operable by the association of two of said devices with the same circuit for permitting the first device associated with said circuit to make tests of said circuit and for preventing the second device associated with said circuit from making tests.

10. In a telephone exchange system comprising a plurality of switching devices, a plurality of testing devices each arranged for progressively testing said plurality of switching devices and each having means automatically operable for temporarily retiring one of two testing devices attempting to test the same switching device, and means to actuate said plurality of testing devices for simultaneously making progressive tests.

11. In a telephone exchange system comprising a plurality of switching devices, a plurality of testing devices each arranged to progressively test said plurality of switching devices, means to actuate said plurality of testing devices, and means in each testing device operative in response to the association of two testing devices with the same switching device to permit one testing device to complete a test of said switching device and hold the second of said testing devices inactive awaiting the completion of said test.

12. In a telephone exchange system comprising a plurality of switching circuits divided into groups, two devices each operable for progressively and variably testing said plurality of switching circuits, means for actuating said devices for simultaneously making said tests, and means automatically operable in each device for controlling an alternate device entering the same group of circuits to cause the second device entering said group to await the completion of tests of the circuits of said group by the first device to enter.

13. In a telephone exchange system comprising a plurality of switching circuits divided into groups, two devices each operable or progressively and variably testing said plurality of switching circuits, means for actuating said devices for simultaneously making said tests, means automatically operable in each device for controlling an alternate device entering the same group of circuits to cause the second device entering said group to await the completion of tests of the circuits of said group by the first device to enter, and means to cause the second device entering the group to test the circuits of said group upon the completion of tests of said circuits by the first device to enter.

In witness whereof, I hereunto subscribe my name this 17 day of October A. D., 1927.

ROBERT E. PEOPLES.